United States Patent
Edelmann

(10) Patent No.: US 11,459,495 B2
(45) Date of Patent: Oct. 4, 2022

(54) BINDER FOR CELLULOSE-CONTAINING MATERIALS

(71) Applicant: SESTEC INNOVATIONS SP. Z O.O., Cracow (PL)

(72) Inventor: Hans-Joachim Edelmann, Bad Harzburg (DE)

(73) Assignee: SESTEC INNOVATIONS SP. Z O.O., Cracow (PL)

(*) Notice: Subject to any disclaimer, the term of this patent is extended or adjusted under 35 U.S.C. 154(b) by 311 days.

(21) Appl. No.: 16/648,783

(22) PCT Filed: Sep. 20, 2018

(86) PCT No.: PCT/EP2018/075536
§ 371 (c)(1),
(2) Date: Mar. 19, 2020

(87) PCT Pub. No.: WO2019/057853
PCT Pub. Date: Mar. 28, 2019

(65) Prior Publication Data
US 2020/0270495 A1    Aug. 27, 2020

(30) Foreign Application Priority Data
Sep. 20, 2017 (EP) .................... 17192254

(51) Int. Cl.
*C09J 189/00* (2006.01)
*B27N 3/00* (2006.01)
*C09J 197/00* (2006.01)

(52) U.S. Cl.
CPC ............ *C09J 189/00* (2013.01); *B27N 3/002* (2013.01); *C09J 197/005* (2013.01)

(58) Field of Classification Search
CPC ..... C09J 189/00; C09J 197/005; C08L 89/00; C08L 97/005; B27N 3/002
See application file for complete search history.

(56) References Cited

U.S. PATENT DOCUMENTS 4,526,580 A * 7/1985 Crooks ..................... A23J 1/10
426/652
11,078,365 B2 * 8/2021 Edelmann ............... C08L 61/22

FOREIGN PATENT DOCUMENTS

| CA | 3017402 A1 | 9/2017 | |
| WO | WO-2008024444 A2 * | 2/2008 | ............ C08L 79/02 |
| WO | 2015086074 A1 | 6/2015 | |
| WO | WO-2015086034 A1 * | 6/2015 | ............ C08G 12/32 |
| WO | WO-2015104565 A2 * | 7/2015 | ............ B27N 3/002 |
| WO | 2015162300 A1 | 10/2015 | |
| WO | WO-2017157646 A1 * | 9/2017 | ............ B27N 3/002 |

OTHER PUBLICATIONS

English-language machine translation of WO-2015086034-A1, performed on Espacenet, Jun. 1, 2022, 34-page document. (Year: 2015).*
M. Olivares et al., "Kraft Lignin Utilization in Adhesives," 22 Wood Sci. Technol. 157-165 (1988). (Year: 1988).*
Pijus Kanti Khatua et al., "Manufacturing of BWP-Grade Plywood from Resin Adhesive Using Animal Protein (Glue) by Partial Replacement of Phenol," 1 International Journal of Polymer Science 28-35 (2015).*
International Search Report and Written Opinion issued in corresponding International Patent Application No. PCT/EP2018/075536 dated Oct. 24, 2018 with English translation of International Search Report (10 pages).

* cited by examiner

*Primary Examiner* — Nicholas E Hill
(74) *Attorney, Agent, or Firm* — Kilyk & Bowersox, P.L.L.C.

(57) ABSTRACT

The invention relates to a binder for cellulose-containing materials which contains a) hydroxyaldehyde, b) a protein-containing component of animal origin and c) a component comprising phenolic oligomers. The invention likewise relates to the use of the binder according to the invention for producing a composite material, to a process for producing a composite material and to a composite material obtainable by the process according to the invention.

18 Claims, No Drawings

BINDER FOR CELLULOSE-CONTAINING MATERIALS

This application is a National Stage Application of PCT/EP2018/075536, filed Sep. 20, 2018, which claims priority to European Patent Application No. 17192254.5, filed Sep. 20, 2017.

The present invention relates to binders for cellulose-containing materials, in particular wood and paper, suitable for the production of composite materials, for example in the form of boards.

Am inoplastics obtained by polycondensation of formaldehyde with compounds containing NH groups are used industrially on a large scale for the production of wood-based composite materials. For this purpose, low-molecular, hardly cross-linked precondensates are provided as binders, which, during the production of the composites, harden to cross-linked duroplasts inter alia under the influence of heat. As wood binders based on aminoplastics, mainly urea-formaldehyde resins (UF resins), melamine-formaldehyde resins (MF resins) and dicyandiamide formaldehyde resins (DD resins) are used.

U.S. Pat. No. 4,172,057 A describes urea-formaldehyde resins and melamine-formaldehyde resins which are modified by the introduction of a hydroxyaldehyde or hydroxyketone such as glucose. The modified resins are processed into fibers and these are used as adhesives for paper production.

A significant disadvantage of the known wood binders based on aminoplasts is that the composites produced with them release formaldehyde, which is classified as carcinogenic (category 1 B according to Annex VI of Regulation 2008/1272/EC). Previous attempts to replace formaldehyde with other carbonyl compounds in wood binders based on aminoplasts have regularly failed due to the fact that the alternative materials are too expensive and the binders obtained do not have the required properties, especially with regard to curing time, mechanical stability and water resistance.

WO 2015/086035 A1 and WO 2015/086074 A1 describe processes for the production of formaldehyde-free resins as binders for composite materials based on wood or natural fibers, in which a hydroxy-monoaldehyde is reacted with an amine, an amide or an aromatic hydroxy compound. The hydroxy-monoaldehydes, in particular glycol aldehyde or glyceral aldehyde, are formed from formaldehyde in an upstream synthesis step by means of a polarity reversal reaction. This process is complex and expensive, and also bears the risk that unreacted formaldehyde from the upstream synthesis step gets into the resin and the composite materials produced from it.

As an alternative to formaldehyde-based aminoplasts, binders based on isocyanates such as polymeric diphenylmethane diisocyanate (PMDI) have also been used to a small extent in the production of wood-based composites. However, those binders are many times more expensive compared to classic am inoplastics. Moreover, it is problematic that composites produced using isocyanate-based binders release considerable quantities of hydrocyanic acid and other toxic cyano compounds in the event of fire or during thermal recycling. In addition, the uncured binders based on isocyanates such as PMDI and the starting materials used for their manufacture such as diphenylmethane diisocyanate (MDI) and methylenediphenylamine (MDA) also have considerable toxicity. Binders based on isocyanates can therefore not be regarded as a safe alternative to formaldehyde-based binders in terms of health and ecology.

DE 10 2014 105 879 A1 describes a process for the production of a composite material comprising a cellulose-containing substrate and a multicomponent binder. A first component of the binder contains animal blood and a second component of the binder contains at least one additive from the group peroxide, urea, alum, aluminium sulphate, sodium sulphite, glycerol, formaldehyde, isocyanate, hexamine, sodium lauryl sulphate, sodium sulphate, aluminium salt, lignin sulphonate, water glass, ethanol, citric acid, sodium hydroxide and/or hydrowax. Formaldehyde or an isocyanate is to be used to improve cross-linking of the binder with wood chips.

The known binders for wood-based composites thus have various disadvantages with regard to the health and ecological risks associated with them, their technical properties or their economic efficiency.

The invention is therefore based on the object of avoiding the disadvantages of the prior art and providing binders for cellulose-containing materials such as wood and paper which have excellent technical properties, in particular with regard to processing times as well as the mechanical stability and water resistance of the composite materials produced therewith, and which are preferably storable and transportable as a one-component system without refrigeration. Furthermore, the binders should be inexpensive and available from natural raw materials in particular. It is also desirable that the binders can be obtained largely or completely without components that are harmful to health and ecologically harmful, such as formaldehyde and isocyanates, and that the composites produced from them are free of the corresponding emissions.

According to the invention, the object is solved by the binder for cellulose-containing materials as described herein. Subject of the invention also are the use of the binder as described herein, the process for the production of a composite material as described herein and the composite material as described herein.

The binder for cellulose-containing materials according to the invention is characterized by the fact that it contains
 (a) hydroxyaldehyde,
 (b) a protein component of animal origin; and
 (c) a component comprising phenolic oligomers.

The term "bonding agent" refers to an agent that can bond or adhere together identical or different materials and substrates within a composite material. In particular, a binder can adhesively, cohesively and/or reactively bond or adhere lumpy materials or extended substrates. The binder can therefore also be referred to as adhesive.

The term 'cellulose-containing materials' in particular refers to materials containing cellulose, hem icellulose, holocellulose or lignocellulose. Examples of cellulose-containing materials are wood, pulp, straw, bagasse, kenaf, bamboo, sisal, hemp, coconut fiber and paper, in particular wood and paper. Cellulose-containing materials may be provided in the form of lumpy materials such as chips and fibers or in the form of extended substrates such as strands, veneers, cardboard and laminated wood. In particular, cellulose-containing materials can be used in the form of solid wood, wood chips, sawdust, groundwood pulp, wood flour, wood dust and mechanical pulp, as well as in the form of recycled materials such as waste wood or waste paper.

According to the invention, the binder contains a hydroxyaldehyde. It is preferred that the hydroxyaldehyde is an α-hydroxy-aldehyde, in particular an α-hydroxy-$C_2$-$C_{10}$-aldehyde, preferably an α-hydroxy-$C_3$-$C_{10}$-aldehyde, particularly preferably an α-hydroxy-$C_3$-$C_5$-aldehyde, particularly preferably an α,β-dihydroxy-$C_3$-$C_5$-aldehyde and most preferably glyceraldehyde.

According to a preferred embodiment, the hydroxyaldehyde is formed in situ from a polyol and an oxidant. The polyol used is in particular a polyol with at least two OH groups, in particular a polyol with at least two vicinal OH groups, preferably a $C_2$-$C_{10}$-polyol with at least two vicinal OH groups, particularly preferably a $C_3$-$C_{10}$-polyol with at least two vicinal OH groups, further preferably a $C_3$-$C_5$-polyol with at least two vicinal OH groups, particularly preferably a $C_3$-$C_5$-polyol with at least three vicinal OH groups and most preferably glycerol. A peroxide is preferably used as oxidizing agent and hydrogen peroxide is particularly preferred. In a particularly preferred embodiment, the hydroxyaldehyde is formed from glycerol and hydrogen peroxide. The polyol is preferably used in an amount of 1 to 30% by weight, in particular 4 to 15% by weight, preferably 6 to 10% by weight and particularly preferably 7 to 8% by weight, based on the total mass of the binder. The oxidizing agent is preferably used in an amount of 0.5 to 10% by weight, in particular 1 to 5% by weight, preferably 1.5 to 4% by weight and particularly preferably 2 to 3% by weight, based on the total mass of the binder. If hydrogen peroxide is used as the oxidizing agent, it is preferably used in the form of an aqueous solution, in particular with a concentration of about 35% by weight.

The protein-containing component of animal origin is preferably haemoglobin, especially haemoglobin from animal blood, or protein concentrate, especially protein concentrate from animal blood. Preferably the protein-containing component is used in the form of a powder such as whole animal blood powder, in particular powder of animal blood category 3, plasma powder or haemoglobin powder. In another embodiment, a protein concentrate obtained by decomposition of animal waste products such as bones and hides is used as the proteinaceous component of animal origin. Such a protein concentrate is available, for example from the company Saval. The protein concentrate can be used in particular in the form of a powder or a concentrate with a solids content of, for example, about 35% by weight. Preferably, the protein-containing component of animal origin is used in an amount, based on dry matter, of 1 to 20% by weight, in particular 3 to 10% by weight, preferably 4 to 10% by weight, based on the total mass of the binder.

The binder also contains a component containing phenolic oligomers. The component containing phenolic oligomers is preferably derived from lignin. Preferably, the phenolic oligomers have a weight-average molar mass in the range of 1000 to 5000 g/mol and especially 2000 to 3000 g/mol. Suitable components containing phenolic oligomers are obtainable in particular by decomposition of lignocelluloses by the Organosolv process (also referred to as the soda process), the Milox process, the Formacell process, the Organocell process and preferably the sulfate process (also known as the Kraft process). A component containing phenolic oligomers obtainable by the sulphate process is also referred to as "Kraft lignin". The component containing phenolic oligomers, preferably kraft lignin, can be used in particular in the form of a spray-dried powder. Furthermore, it is preferred that the component containing phenolic oligomers, in particular kraft lignin, is used in an amount, based on the dry matter, of 1 to 20% by weight, in particular 2 to 15% by weight, preferably 2 to 12% by weight and particularly preferably 6 to 10% by weight, based on the total mass of the binder.

In a preferred embodiment, the binder according to the invention also contains (d) a protein-containing component of plant origin.

It is particularly preferred that the protein-containing component of plant origin is a plant stillage. The term "plant stillage" refers to a process residue derived from a plant material, such as in particular a distillation residue, for example in the production of bioethanol, a pulp, for example in the production of potato starch, or a press cake, for example in the production of seed oil. Possibly, a liquid portion of the process residue can be separated by filtration or precipitation to form plant stillage. Examples of suitable plant materials are hops, barley, wheat, rice and corn. A plant stillage based on cereals, especially wheat, is particularly preferred. Moreover, It is preferred that the protein-containing component of plant origin has a protein content of 10 to 50% by weight, in particular 20 to 40% by weight and most preferably about 30% by weight.

The protein-containing component of vegetable origin is preferably used in an amount, based on dry matter, of 0 to 20% by weight, in particular 1 to 15% by weight, preferably 3 to 7% by weight and particularly preferably 4 to 6% by weight, based on the total mass of the binder. Furthermore, it is preferred that the binder contains phenolic oligomer-containing component, in particular kraft lignin, and protein-containing component of plant origin, in particular plant stillage, in a weight ratio, in each case based on the dry matter, of 3:1 to 1:3, in particular 2:1 to 1:2, preferably 1.5:1 to 1:1.5 and particularly preferably about 1:1.

Preferably, the binder also contains other protein-containing components of animal origin, in particular casein. The further protein-containing component of animal origin is preferably used in an amount, based on the dry matter, of 0 to 20% by weight, in particular 1 to 15% by weight, preferably 2.5 to 15% by weight and particularly preferably 2.5 to 5% by weight, based on the total mass of the binder. The binder particularly preferably contains calcium oxide or calcium hydroxide, particularly in an amount of 0.5 to 5% by weight, particularly 1 to 4% by weight and particularly preferably 2 to 3% by weight, based on the dry matter of the further protein-containing component of animal origin.

According to a preferred embodiment, the binder also contains an amide and/or a dialdehyde. Examples of suitable amides are caprolactam, urea and especially melamine. Preferably, the amide is used in an amount of 0 to 40% by weight, in particular 1 to 30% by weight, preferably 2 to 10% by weight and particularly preferably 4 to 6% by weight, based on the total mass of the binder. In a particularly preferred embodiment, the amide is used in an amount of 0 to 10% by weight, in particular 1 to 8% by weight, preferably 2 to 6% by weight and particularly preferably 4 to 5% by weight, based on the total mass of the binder. In another particularly preferred embodiment, the amide is used in an amount of 1 to 40% by weight, in particular 10 to 35% by weight and preferably 20 to 30% by weight, based on the total mass of the binder. Examples of suitable dialdehydes are glutaraldehyde and in particular glyoxal. The dialdehyde is preferably used in an amount of 0 to 10% by weight, in particular 1 to 8% by weight, preferably 2 to 6% by weight and particularly preferably 3 to 4% by weight, based on the total mass of the binder. Particularly preferably the binder contains a combination of an amide and a dialdehyde and in particular a combination of melamine and glyoxal. The amide and dialdehyde are preferably used in a molar ratio of 1:1 to 1:10, in particular 1:2 to 1:7.5 and preferably 1:2.5 to 1:5.

According to another preferred embodiment, the binder also contains a carboxylic acid, a carboxylic acid salt and/or a carboxylic acid anhydride, in particular acetic acid or an acetate, maleic acid or a maleate and/or maleic anhydride. The carboxylic acid, the carboxylic acid salt and/or the carboxylic acid anhydride are preferably used in an amount of 0 to 20% by weight, in particular 1 to 15% by weight, preferably 2.5 to 10% by weight and particularly preferably 2.5 to 5% by weight, based on the total mass of the binder. Binders containing carboxylic acid, carboxylic acid salt and/or carboxylic acid anhydride are particularly suitable for wood-free cellulose-containing materials such as straw, paper, cardboard and pasteboard.

The binder moreover may contain additives. Examples of suitable additives are wetting agents for better wetting of the substrate, defoamers, thickeners, smoothing agents, flame retardants, dyes and preservatives such as fungicides. Usually additives are used in an amount of up to 15% by weight, in particular up to 10% by weight and preferably up to 5% by weight, based on the total mass of the binder. To achieve particularly long storage life, a preservative and in particular a fungicide such as betanaph-tol or thymol, preferably in an amount of 0.1 to 10% by weight, in particular 0.5 to 5% by weight and particularly preferably 1 to 3% by weight, based on the total mass of the binder, will be used.

Moreover, the binder usually contains water. Preferably, the binder has a water content of 0 to 80% by weight and, in particular, of 40 to 75% by weight.

Furthermore, the binder according to the invention preferably has a pH value in the range from 8 to 11, preferably a pH value in the range from 8.5 to 10, preferably a pH value in the range from 9 to 10 and most preferably a pH value of about 9.

It is further preferred that the binder contains less than 5.0% by weight, in particular less than 2.0% by weight, preferably less than 1.0% by weight, most preferably less than 0.5% by weight of ammonium salts such as ammonium sulfate, ammonium alum, ammonium lignin sulfonate and ammonium hydrogen phosphate and most preferably is substantially free of ammonium salts.

Furthermore, it is preferred that the binder contains less than 2.0% by weight, in particular less than 1-0% by weight, preferably less than 0.5% by weight, particularly preferably less than 0.1% by weight, of formaldehyde and most preferably is substantially free of formaldehyde.

A binder which is obtainable by mixing the following components is particularly preferred according to the invention, at least one and preferably all of the components being used in the indicated amounts, based on the total mass of the mixture:

| Component | Percent by weight |
|---|---|
| Polyol | 1-30, especially 4-15 |
| Oxidizing agent | 0.5-10, especially 1.5-4 |
| Protein-containing component of animal origin (dry matter) | 1-20, especially 3-10 |
| phenolic oligomers containing component (dry matter) | 1-20, especially 2-12 |
| Protein-containing component plant origin (dry matter) | 0-20, especially 3-7 |
| Casein | 0-20, especially 2.5-15 |
| Water | 0-80, especially 40-75, | and, where appropriate, the mixture obtained is dried.

The ranges defined above for the amoungs of the individual components in relation to the total mass of the binder represent further preferred ranges for the amounts of the components used in relation to the total mass of the mixture.

Furthermore, a binder which contains at least two and preferably all of the following components in the specified proportions by weight is particularly preferred:

| Component | Weight proportion |
|---|---|
| Hydroxyaldehyde | 5-25, especially 10-20 |
| protein-containing component of animal origin (dry matter) | 5-25, especially 10-20 |
| phenolic oligomers containing component (dry matter) | 4-40, especially 5-30 |
| Protein-containing component plant origin (dry matter) | 1-25, especially 3-12 |
| Casein | 0-40, especially 5-30. |

Surprisingly, it turned out that the binder according to the invention has a number of properties that are particularly advantageous for the production of composite materials. In particular, the binder hardens in a controlled and rapid manner under the usual conditions for the production of composite materials such as chipboards and can therefore be used in a particularly advantageous manner in continuous production processes for composite materials. Composite materials produced in this way have excellent mechanical stability and water resistance. In particular, the composite materials have at least a water resistance of class P3 according to DIN EN 312-1. The binder is also available from inexpensively available natural raw materials and can be formed without components such as formaldehyde and isocyanates that are harmful to health and the environment. Furthermore, the binder can be stored and transported for months as a one-component system without refrigeration.

Usually the binder is used in undiluted form. Alternatively, the binder can also be used diluted, for example as a primer. Finally, the binder can also be used in dried form.

The binder according to the invention can also be used in combination with known binders. Examples of suitable known binders are polymeric diisocyanate (PMDI), emulsion polymeric isocyanate (EPI), polyvinyl acetate (PVAC), resins based on furfural and furfuryl alcohol, polyurethane, epoxy resins and crosslinked polymers based on saturated and unsaturated acrylates. The binder according to the invention is compatible with known binders, especially in the form of commercial dispersions, in all mixing ratios.

The binder according to the invention is particularly suitable for the production of composite materials. The subject matter of the invention is therefore also the use of the binder according to the invention for the production of composite materials, in particular on the basis of a cellulose-containing material. Examples of suitable cellulose-containing materials are wood, cellulose, straw, bagasse, kenaf, bamboo, sisal, hemp, coconut fiber, paper, cardboard and paperboard, in particular wood and paper. In particular, cellulose-containing materials may be used in the form of solid wood, wood chips, sawdust, groundwood, wood flour, wood dust and mechanical pulp as well as in the form of recycled materials such as waste wood or waste paper.

The subject of the invention is also a process for the production of a composite material in which a cellulose-containing material is processed with the binder according to the invention. The binder according to the invention sets with cellulose-containing materials, in particular under heat and preferably under heat and pressure. Preferably, the process comprises a step in which the binder is pressed with a cellulose-containing material. Typically, the processing takes place at temperatures of 100 to 250° C. and in particular at a pressure of 1 to 250 bar, preferably 10 to 180 bar.

The binder can be used on all common processing machines such as automated production lines, but also manual presses, without any special adaptations. All known and common procedures can also be carried out with the binder according to the invention.

By controlling temperature and pressure, the processing times and setting behavior of the binder according to the invention can be easily adjusted. The pressing time for composite boards is usually dependent on the type of cellulose-containing material, the pressing temperature, the pressing pressure and the thickness of the boards. With the binder according to the invention, pressing times of less than 10 s/mm board thickness can be implemented under normal processing conditions.

Finally, the subject of the invention is also a composite material which is obtainable by the process according to the invention. Examples of suitable composite materials are flat and three-dimensionally formed products and moulded bodies, especially for the furniture and construction industry, such as boards, especially furniture boards, building material boards and heat insulation boards, bricks, pallet blocks, concrete formwork parts, extruded parts and 3-D molded parts as well as dust-bound recycling products and recycled paper boards.

In the following, the invention is explained in more detail by way of embodiments.

EMBODIMENTS

Ten binders according to the invention in accordance with the following table were formed and used for the production of various composite materials:

| Example (% by weight) | 1 | 2 | 3 | 4 | 5 | 6 | 7 | 8 | 9 | 10 |
|---|---|---|---|---|---|---|---|---|---|---|
| Glycerol[1] | 6 | 8 | 10 | 10 | 5 | 7 | 10 | 5 | 15 | 7 |
| Hydrogen peroxide[2] | 7 | 8 | 5 | 6 | 10 | 10 | 8 | 6 | 5 | 6 |
| Animal Protein[3] | 5 | 8 | 10 | 8 | 5 | 5 | 5 | 4 | 3 | 5 |
| Kraft lignin[4] | 25 | 5 | 15 | 10 | 7 | 12 | 10 | 10 | 30 | 20 |
| Plant lignin stillage[5] | 28 | | 8 | 8 | 7 | 12 | 15 | 20 | 10 | 15 |
| Casein | | | | 4 | | | 10 | 10 | | 15 |
| Melamine | | 15 | 10 | 6 | 10 | 6 | | | | |
| Glyoxal[6] | | 15 | 10 | | 10 | 7 | | | | |
| Paraffin[7] | | 2 | | | 1 | | | | | 1 |
| Fluorocarbonate | | | | 2 | | 4 | | 6 | | 4 |
| Maleic acid | | | | 2 | | | | | | |
| Polyamideamine | | | | | 5 | | | | | |
| Epichlorohydrin | | | | 5 | | | | | | |
| Tannin | | | | | | | 5 | | 8 | |
| Hexamethylenetetramine | | | 2 | | 5 | | 2 | | 4 | |
| Resorcinol | | | | 2 | | 2 | | 3 | | |
| Naphthalene sulphonic acid | | 9 | | | | | | | | |
| Defoamer | 1 | | | | | | | 1 | | |
| Flour | | | | | | | 10 | 10 | | |
| 5-(Hydroxymethyl)-furfural | | | | 7 | | | | | | |
| Water | 28 | 30 | 30 | 30 | 35 | 25 | 25 | 35 | 25 | 27 |

[1])85% aqueous solution
[2])35% aqueous solution
[3])Examples 1-5 and 7-10: spray-dried haemoglobin
Example 6: Protein concentrate from Saval
[4])40% aqueous solution
[5])Solid content 20% by weight
[6])35% aqueous solution
[7])60% aqueous solution

| Example (% by weight) | 11 | 12 | 13 | 14 | 15 | 16 |
|---|---|---|---|---|---|---|
| Glycerol[1] | 11 | 11 | 6 | 6 | 6 | 6 |
| Hydrogen peroxide[2] | 7 | 7 | 7 | 7 | 7 | 7 |
| Animal Protein[3] | 5 | 5 | 5 | 5 | 5 | 5 |
| Kraft lignin[4] | 50 | 30 | 20 | 25 | 25 | 30 |
| Plant lignin stillage[5] | | 20 | 20 | 22 | 24 | 20 |
| Casein | | | | 3 | | |
| CaO | | | | 1.6 | | |
| NaOH | | | | 0.3 | | |
| Silicate | | | | 1 | | |
| CuCl | | | | 0.1 | | |
| Caprolactam | | | | | 5 | |
| Glutaraldehyde | | | | | 3 | |
| Maleic anhydride | | | | | | 5 |
| Water | 27 | 27 | 36 | 30 | 30 | 27 |

[1])80% aqueous solution
[2])35% aqueous solution
[3])40% aqueous solution
[4])Solid content 20% by weight

EXAMPLE 1

Chipboard

A one-component binder with composition 1 according to the above table was formed by mixing the starting components indicated. For the production of a chipboard, pine wood chips (screen fraction >0.6 mm×4 mm, 4 wt. % moisture content) were mixed with the binder by spraying in a drum mixer to achieve uniform wetting of the chips. The mass fraction of the binder was 8% by weight.

The chips wetted with the binder were evenly scattered onto a press plate which was wetted with a commercially available release agent so that a chip cake was formed. The chip cake was pre-pressed by hand and then pressed in a laboratory plate press at a temperature of 200° C. for a period of 120 s at a pressure of 150 bar. The pressing time was measured from the time the pressure was completely built up. A chipboard with a thickness of 12 mm was obtained, i.e. the pressing time was 10 s/mm board thickness.

For the obtained chipboard the following technical values were determined according to DIN EN 312-1 (2010):
Thickness swelling: 14%
Bending strength: 15.2 N/mm$^2$
Bending modulus of elasticity: 2954 N/mm$^2$
Transverse tensile strength: 0.62 N/mm$^2$ This means that the technical values for class P3 chipboard according to DIN EN 312-1 (2010) have been achieved.

The formaldehyde emission of the chipboard obtained was determined using the chamber method according to DIN EN 717-1 (2006). This was 0.024 mg/m$^3$ after 12 h, 0.019 mg/m$^3$ after 24 h and 0.005 mg/m$^3$ after 240 h. Surprisingly, the natural formaldehyde emission of untreated pine wood chips was even 6 times lower.

EXAMPLE 2

Oriented Strand Board Plate

A one-component binder with composition 2 according to the above table was formed by mixing the starting components indicated. To produce a 12 mm thick OSB (Oriented Strand Board) board, wood flakes (2-4% moisture content by weight) were wetted with the binder using a drum process. The mass portion of the binder was 8% by weight.

The flakes wetted with the binder were scattered to form a cake and placed in a board press for pressing. The cake thus prepared was then pressed at a temperature of 200° C. and a pressure of 165 bar over a period of 120 s to form an OSB board.

The technical values for class P3 OSB boards according to DIN EN 312-1 (2010) were achieved.

EXAMPLE 3

Thin Chipboard

A one-component binder with composition 3 according to the above table was formed by mixing the starting components indicated. To produce a thin chipboard (3.0 mm) with a specific weight of 820 kg/m$^3$ according to the Mende process on a calender (AUMA 30), pine wood chips (screen fraction >0.6 mm x 4 mm) were wetted with 115 kg of binder (corresponding to a binder content of 14% by weight) in a drum mixer (Lödige).

The 3.0 mm thick board was formed over 30 s at 140 bar pressure and a temperature of 175° C. The feed rate of the calender plant was 22 m/m in.

The technical values for class P3 thin chipboard according to DIN EN 312-1 (2010) were achieved.

EXAMPLE 4

Chipboard

A one-component binder with the composition 4 according to the above table was formed by mixing the indicated starting components. To produce a chipboard (of a thickness of 22 mm), pine wood chips (sieve fraction >0.6 mm×4 mm, 2.5% by weight of moisture content) were mixed with the binder by spraying and a chip cake was formed. The mass fraction of the binder was 8% by weight.

The chip cake was pressed at a temperature of 200° C., a pressure of 155 bar and a pressing time of 12 s/mm board thickness in a single-opening press.

The technical values for class P3 chipboard according to DIN EN 312-1 (2010) were achieved.

EXAMPLE 5

Medium Density Fibreboard

A one-component binder with composition 5 according to the above table was formed by mixing the starting components indicated. To produce a medium density fiberboard (MDF board), pine chips defibered by a refiner were dried to a moisture content of about 1% by weight. The binder was applied by drum gluing in a spray process. The mass proportion of the binder was 8% by weight.

The wetted wood fibers were pressed at 185° C. and a pressure of 140 bar. The pressing time in a continuous press was 8 s/mm board thickness. A 6 mm board was produced in 48 s.

The technical values for MDF boards of class P3 according to DIN EN 312-1 (2010) were achieved.

EXAMPLE 6

Plywood Panel

A two-component binder with composition 6 according to the above table was formed by mixing the starting components indicated. The binder component A contained glycerol, hydrogen peroxide, Saval protein concentrate, plant stillage and flour and the binder component B contained Kraft lignin, fluorocarbonate, melamine, glyoxal and resorcinol.

For the production of plywood boards (laminated wood), binder component A was rolled onto one side of a 2 mm thick birch veneer, which was stretched with type 405 wheat flour in order to increase the solids content and prevent the binder from "piercing". The application rate of binder component A was 80 g/m$^2$. Binder component B was rolled onto one side of a second birch veneer. The application rate of binder component B was 40 g/m2. Then the top surfaces of the two veneers, to which the binder components were applied, were placed crosswise on top of each other and pressed together at a pressing temperature of 140° C. and a pressure of 65 bar for a period of 120 s.

EXAMPLE 7

Veneered Surface

A one-component binder with the composition 7 according to the above table was formed by mixing the indicated starting components. To produce a veneered surface, the binder was rolled onto both sides of a chipboard with 80 g/m2 as a carrier board using a double-sided glue application roller. The glued carrier board was placed on oak veneer with a thickness of 0.8 mm. The upper side was also covered with oak veneer and fed to a short-cycle press. The pressing pressure was 70 N/mm$^2$ and the pressing time 90 s at 110° C.

EXAMPLE 8

Chipboard

A one-component binder with the composition 8 according to the above table was formed by mixing the indicated starting components. To produce a chipboard (of a thickness of 16 mm), pine wood chips (screen fraction >0.6 mm×4 mm, 2-4% by weight of moisture content) were mixed with the binder by spraying and a chip cake was formed. The mass fraction of the binder was 7% by weight.

The chip cake was pressed at a temperature of 210° C. and a pressure of 150 bar with a pressing time of 130 s on a single-opening press.

The technical values for class P3 chipboard according to DIN EN 312-1 (2010) were achieved.

EXAMPLE 9

Straw Board

A one-component binder with the composition 9 according to the above table was formed by mixing the indicated starting components. The binder was applied by means of a batch mixer (Lodige) with two dosing nozzles to untreated straw fibers with a length of up to 20 mm (approx. 6% by weight of moisture content). The mass fraction of the binder was 10% by weight.

The wetted straw fibers were pressed at 180° C. and a pressure of 140 bar. The pressing time in a single-opening press was 12 s/mm of board thickness. By means of spacer plates a board of 20 mm of board thickness with a specific weight of 550 kg/m3 was produced.

The following values were determined according to DIN EN 622:
  Bulk density: 550 kg/m$^3$
  Transverse tensile strength: 0.58 N/mm$^2$
  Thickness swelling (24 h): 14.3%
  Bending strength: 28.2 N/mm$^2$
The technical values for class P3 fiberboards according to DIN EN 622 have thus been achieved.

Thus, the binder according to the invention also enables the production of composite materials based on cellulose-containing natural products such as straw, whose surface has a silicate or wax layer. This is particularly surprising because conventional binders, for example based on am inoplastics, are not suitable for processing such natural products.

Instead of straw, other cellulose-containing fibers may be used, preferably based on young plants or annual plants or shredded husks such as corn cobs, peanut shells and the like, and recycled paper.

EXAMPLE 10

Fiberboard

A one-component binder with the composition 10 according to the above table was formed by mixing the indicated starting components. For the production of a fiberboard, wood chips defibered by a refiner were dried to a moisture content of about 4% by weight. The binder was sprayed onto the wood fibers using a ploughshare mixer and airless spraying. The mass fraction of the binder was 8% by weight. The wetted wood fibers were pressed at 200° C. using spacer plates to form a 20 mm thick board with a specific weight of 120 kg/m$^3$. The pressing time was 160 s and thus 8 s/mm board thickness.

The bending strength of the fiberboard obtained in accordance with DIN EN 622-4 was 1.3 N/mm$^2$. Thus, the technical values for porous wood fiber boards for exterior use according to DIN EN 622-4 were achieved.

The emission of volatile organic compounds (VOCs) from the fiberboard obtained after 5 h, 24 h and 48 h is shown in the following table:

|  | after 5 h | after 24 h | after 48 h |
| --- | --- | --- | --- |
| VOC (<C6) | 34 μg/m$^3$ | 46 μg/m$^3$ | 65 μg/m$^3$ |
| VOC (C$_6$-C$_{16}$) | 34 μg/m$^3$ | 29 μg/m$^3$ | 27 μg/m$^3$ |
| VOC (total) | 68 μg/m$^3$ | 75 μg/m$^3$ | 92 μg/m$^3$ |

The invention claimed is:

1. Binder for cellulose-containing materials containing
   a) hydroxyaldehyde,
   b) protein-containing component of animal origin and
   c) phenolic oligomer-containing component, wherein the phenolic oligomer-containing component has a weight-average molar mass in the range from 1000 g/mol to 5000 g/mol and the phenolic oligomer-containing component is Kraft lignin.

2. The binder according to claim 1, in which the hydroxyaldehyde is an α-hydroxy-aldehyde.

3. The binder according to claim 1, in which the hydroxyaldehyde in situ is formed from a polyol with at least two OH groups.

4. The binder according to claim 3, which is obtained by mixing:
   1-30 percent by weight of the polyol;
   0.5-10 percent by weight of an oxidizing agent;
   1-20 percent by weight of the protein-containing component of animal origin (dry matter);
   1-20 percent by weight of the phenolic oligomer-containing component (dry matter);
   0-20 percent by weight of a protein-containing component of plant origin (dry matter);
   0-20 percent by weight of casein; and
   0-80 percent by weight of water
   and, the mixture obtained is optionally dried.

5. The binder according to claim 1, which has at least two of the following components:
   5-25 proportion by weight of the hydroxyaldehyde;
   5-25 proportion by weight of the protein-containing component of animal origin (dry matter)
   4-40 proportion by weight of the phenolic oligomer-containing component (dry matter);
   1-25 proportion by weight of a protein containing component of plant origin (dry matter); and
   0-40 proportion by weight of casein.

6. The binder according to claim 1, in which the protein-containing component of animal origin contains hemoglobin.

7. The binder according to claim 1, wherein the phenolic oligomer-containing component has a weight-average molar mass in the range from 2000 to 3000 g/mol.

8. The binder according to claim 1, further containing
d) protein-containing component of plant origin.

9. The binder according to claim 8, wherein the protein-containing component of plant origin is a plant stillage.

10. The binder according to claim 1, wherein the protein-containing component of animal origin is casein.

11. The binder according to claim 1, further containing an amide.

12. The binder according to claim 1, further containing a carboxylic acid, a carboxylic acid salt and/or a carboxylic acid anhydride.

13. The binder according to claim 1, which has a pH value in the range from 7 to 12.

14. The binder according to claim 1, containing less than 5.0 wt.-% of ammonium salts.

15. The binder according to claim 1, containing less than 2.0 wt.-% of formaldehyde.

16. A composite material comprising the binder of claim 1 and at least one cellulose-containing material.

17. A process for producing a composite material, said process comprising combining said binder according to claim 1 with a cellulose-containing material at a temperature in the range from 100 to 250° C. and at a pressure of 1 to 250 bar.

18. A composite material, which is obtained by the method according to claim 17.

* * * * *

UNITED STATES PATENT AND TRADEMARK OFFICE
CERTIFICATE OF CORRECTION

| | |
|---|---|
| PATENT NO. | : 11,459,495 B2 |
| APPLICATION NO. | : 16/648783 |
| DATED | : October 4, 2022 |
| INVENTOR(S) | : Hans-Joachim Edelmann |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 358 days.

Signed and Sealed this
Eleventh Day of June, 2024

Katherine Kelly Vidal
*Director of the United States Patent and Trademark Office*